Jan. 17, 1933.  G. D. GARDNER  1,894,738

DRAINER APPARATUS

Filed March 12, 1930

INVENTOR.
GEORGE D. GARDNER
BY Lincoln Johnson
ATTORNEYS.

Patented Jan. 17, 1933

1,894,738

UNITED STATES PATENT OFFICE

GEORGE D. GARDNER, OF SAN JOSE, CALIFORNIA, ASSIGNOR TO GARDNER MANUFACTURING COMPANY, LTD., OF SUNNYVALE, CALIFORNIA, A CORPORATION OF CALIFORNIA

DRAINER APPARATUS

Application filed March 12, 1930. Serial No. 435,207.

This invention relates to a draining apparatus.

It is the primary object of the invention to provide a draining apparatus particularly adapted to be used for draining filled cans, in which apparatus the cans are carried for a certain length of travel in an inverted position to drain the fluid therefrom, means being provided to prevent the removal of the food from the can, during the draining operation.

Particularly it is an object of the invention to provide a draining apparatus for filled cans, wherein a plurality of carriers are moved by an endless conveyor, each carrier being adapted to receive and hold a can in an upright position, and to hold the can in an inverted position as the carrier is traveling on the return path of the endless conveyor; a perforated cover of the carrier lies upon the open top of the can to allow the draining of the fluid without disturbing the solid food in the can, guiding means being provided adjacent to the conveyor to hold the cover closed while the can is drained and to open the cover at certain points of the carrier travel for the introduction and the removal of the cans from the carrier; the carrier and the can therein being passed thru a heated chamber during the draining operation to effect the draining under heat.

Particularly it is an object of the invention to provide a carrier for a draining apparatus, which has an open base upon which the can is received, and a perforated top resting on the can to hold the same in place and to permit the draining of the fluid from the can without the removal of the solid food therefrom, said cover being tiltable to an open position and being adapted to be acted upon by guides alongside the apparatus, so as to be opened for the intake and the discharge of the cans from the base, and to be held firmly closed while the carrier and the can are moved in an inverted position in the apparatus.

Other objects and advantages are to provide a draining apparatus that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing wherein.

Figure 1:
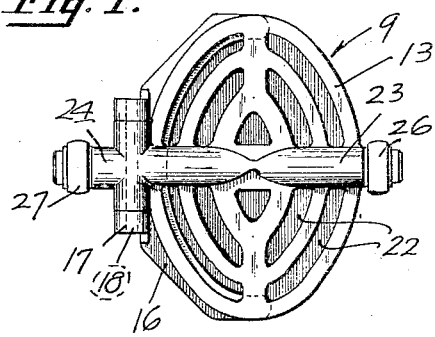
Fig. 1 is a top plan view of a carrier of the apparatus.

In its general organization the apparatus includes an endless conveyor 6 supported and driven by sprockets or wheels 7, which latter are journaled in standards 8. On the conveyor are secured in longitudinally spaced relation, a plurality of carriers 9 to carry cans on the path traversed by the conveyor 6. The entire conveying and draining mechanism is preferably enclosed in a box 11 to allow the treating of the content of the cans during the draining operation. For instance the box 11 may be used as a heating box within which the filled cans are drained under dry or wet heat, as the case may be.

The apparatus is used to drain undesirable fluid that collects in the cans during the treatment; such as the cooking of the content thereof. The cans are introduced into the carriers 9 at the inlet A and are carried around by the return movement of the endless conveyor in an inverted position to the other turn of the conveyor 6. The drained cans are removed from the carriers 9 at the outlet B.

In order to prevent the accidental injury or discharge of the solid food from the filled cans, the carriers 9 are constructed in two parts, namely, an open base 12 and a perforated cover 13. It is to be noted that the conveyor 6 is formed by an endless chain and the underside of each base 12 has a bracket 14 thereon to mount the base 12 on a link of the chain conveyor 6. The base 12 and the cover 13 are illustrated in the drawing as being oval shaped, however, the same may be formed of any desired shape conforming to the outline of the filled can drained. On one side of the top face of the base 12 is an arcuate flange 16. Intermediate the ends of the flange 16 extend bearing brackets 17 in which the cover 13 is tiltably or hingedly supported by means of a pivot pin 18. Thus the pivotal support of the cover 13 is disposed in an out of way position, inasmuch as the can is moved on and off the base 12 thru the unflanged and unobstructed side or edge of the said base.

The cover 13 is formed with downwardly turned retaining edges 19 and has a retaining lug 21 at each end thereof to securely engage the open top of the can whereby the can is held on the base against accidental displacement. The perforations on the cover 13 are in the form of substantially concentric arcuate slots 22. The webs between the slots 22 prevent the escaping of the solid food from the can when the same is carried in an inverted position.

Rib extensions 23 and 24 on the cover 13 protrude beyond the side edges of the latter, substantially at right angles to the direction of the conveyor movement. The extensions 23 and 24 have rollers 26 and 27 respectively, mounted on the ends thereof. By exerting a pressure on both rollers 26, in the direction of the base 12, the cover 13 is securely held against opening. If the roller 27 alone is moved toward the base 12, the cover 13 is tilted around the pivot 18, thereby releasing the can, or allowing the introduction of another can upon the base 12.

Figure 4:
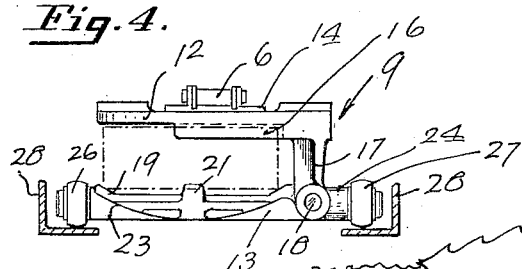
Fig. 4 is an end view of the carrier in an inverted position, on the return of the conveyor.
Figure 5:
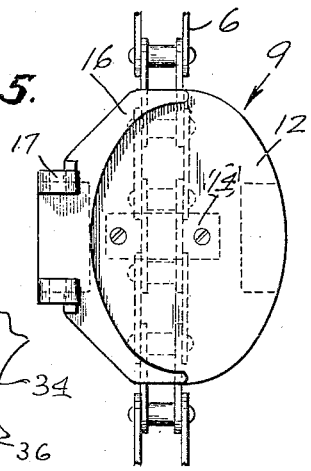
Fig. 5 is a detail view of the base of the carrier as mounted on the conveyor.

While the carriers 9 are moved from the outlet B to the inlet A, the covers 13 are held in closed position by gravity. In order to hold the covers 13 tight upon the can in the carrier 9 during its travel from the inlet A to the outlet B, guide rails 28 are provided adjacent the underside of the conveyor 6. The rails 28 are preferably angle iron rails upon which the rollers 26 and 27 travel in the manner shown in Fig. 4. Thus, during the draining of the can the cover 13 is held closed. Each end of each rail 28 terminates in an arcuate guard 29, which is substantially concentric with the respective sprocket wheels 7. At the turns of the conveyor 6 the rollers 26 and 27 ride on the angle iron guard rails 29, whereby the cover 13 is held against tilting.

At the opposite edges of the upper portion of the conveyor 6 angle iron rails 31 are provided upon which the underside of the bases 12 may rest while the carriers 9 are advanced in upright position.

Figure 2:
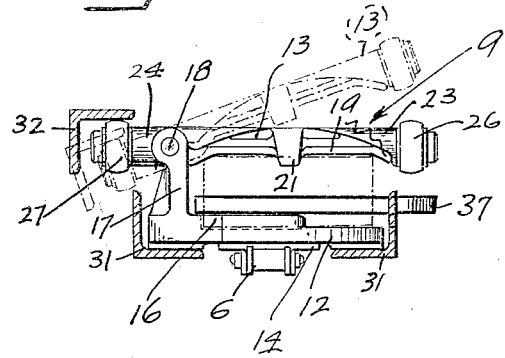
Fig. 2 is an end view of the carrier on the tracks or guides of the apparatus, the tilted position of the top being indicated in dash and dot lines.
Figure 3:
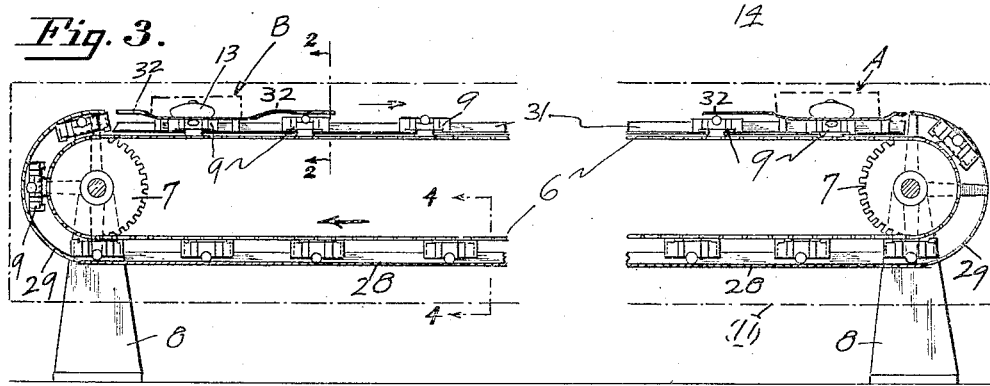
Fig. 3 is a longitudinal sectional view of the apparatus showing the arrangement of the endless conveyor with the carriers thereon, and of the guides related to the conveyor.
Figure 6:
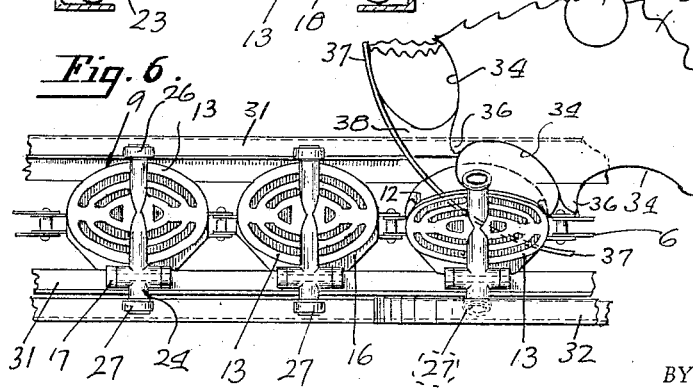
Fig. 6 is a fragmental plan view of the apparatus showing the carrier riding on the tracks or guides at the can inlet where the cover is tilted.

The tilting of the cover 13 at the inlet A and at the outlet B is accomplished by comparatively short cam rails 32, disposed so that the roller 27 engages the underside thereof. The end of the rails 32 at which the rollers 27 enter thereunder, are bent upwardly to facilitate the gradual engagement of the rollers 27 with the cam rails 32. The cam rails 32 are at a lower level than normal position of the rollers 27, so that the said rollers 27 are depressed thereby and the cover 13 is held in the tilted position thereat, as indicated in Figs. 2 and 6. While the cover 13 is thus tilted, the cans may be introduced onto the base 12 at the inlet A, or removed from the carrier 9 at the outlet B.

The introduction and the removal of the cans to the carriers 9 is effected by similar mechanisms, therefore the detail description of the inlet mechanism will suffice. A rotary disc wheel 33 is driven by a rotary shaft 34 in synchronism with the movement of the conveyor 6. The wheel 33 has circumferentially spaced cuts or notches 34 conforming to the shape of the can handled. The cogs 36 of the wheel 33 traverse a path overlying the base 12. A guide 37 extends into the open carrier 9 in the direction of conveyor movement, and is disposed partly around a section of the periphery of the wheel 33. The guide 37 is arcuate and extends over the base 12 so as to clear the brackets 17, thus guiding the cans from a table 38 onto the carrier 9. The table 38 is disposed beneath the wheel 33 and the guide 37. The can and the carrier 9 move in the same direction and at the same speed, while the can is advanced by the wheel 33 onto the carrier 9. The outlet B is provided with a mechanism similar to the afore-described inlet mechanism, except that the guide 37 extends from the carrier 9 in a direction opposite to the inlet guide 37, so as to engage the periphery of the can on the approaching open carrier 9, and to guide the can from the carrier 9 onto the table 38 as the can is advanced by the carrier 9. The wheel 33 at the outlet, moves at such a speed that it engages a can as the same slides off the base 12. Thereafter the can is advanced by the wheel 33 to any desired conveyor mechanism.

Both the inlet and the outlet wheels 33 rotate in a contra-clockwise direction viewing the top of the apparatus as in Fig. 6. The bars 31 are cut away at the inlet and at the outlet to accommodate the wheels 33 and the guides 37.

In operation the open cans are fed onto the carriers 9 at the inlet A, while the cover is tilted thereat, then the cover 13 is closed upon the open end of the can and the carrier 9 is carried around the adjacent turn of the conveyor to the return of the conveyor, where the carrier 9 and the can therein are moved in an inverted position. The cover 13 is held closed by the guide bars 28. During the return travel of the inverted cans the same are drained. Then the carriers 9 are conveyed around the outer turn of the conveyor 6 and are moved past the outlet B in an upright position. The cover 13 is tilted thereat and the drained can is removed from the base 12 in the manner heretofore set forth. The box 11 is preferably heated, whereby the draining of the cans is greatly facilitated.

Having thus described this invention what I claim and desire to secure by Letters Patent is:

1. In a drainer apparatus a conveying mechanism; a plurality of carriers thereon; an inlet for containers to be drained being related to the mechanism; an outlet for discharge of the drained containers being related to the mechanism in advance of the inlet in respect to the conveyor movement, said conveyor mechanism being adapted to advance the carriers in inverted position on a part of the distance between the inlet and the outlet, and to advance the carriers in upright position at and from the outlet to the inlet; means on each carrier to grip the container therein in an upright position at said inlet, said gripping means being adapted to retain solid contents of the container and transmit fluid substances drained from the container as the container is carried in said inverted carrier.

2. In a drainer apparatus a conveying mechanism; a plurality of carriers thereon; an inlet for containers to be drained, being related to the mechanism; an outlet for discharge of the drained containers being related to the mechanism in advance of the inlet in respect to the conveyor movement, said conveyor mechanism being adapted to advance the carriers in inverted position on a part of the distance between the inlet and the outlet, and to advance the carriers in upright position at and from the outlet to the inlet; means on each carrier to grip the container therein in an upright position at said inlet, said gripping means being adapted to retain solid contents of the container and transmit fluid substances drained from the container as the container is carried in said inverted carrier; and means at the inlet and at the outlet to release said gripping means to allow respectively the introduction and the removal of the containers from the carriers.

3. In a draining apparatus, a conveyor mechanism; an inlet operatively related thereto; an outlet operatively related to said mechanism in advance of the inlet in respect to the conveyor movement; a plurality of carriers on said mechanism to be carried thereby; a tiltable perforated cover on each carrier being adapted to hold containers on said carriers, said conveyor mechanism being adapted to advance the carriers in inverted position on a part of the distance between the inlet and the outlet to drain the fluid content of the containers, and to advance the carriers in upright position at and from the outlet to the inlet for the upright removal and introduction of the containers; and means operatively related to the conveyor mechanism to hold the cover against tilting when the carrier is inverted.

4. In a draining apparatus, a conveyor mechanism; an inlet operatively related thereto; an outlet operatively related to said mechanism in advance of the inlet in respect to the conveyor movement; a plurality of carriers on said mechanism to be carried thereby; a tiltable perforated cover on each carrier being adapted to hold containers on said carriers, said conveyor mechanism being adapted to advance the carriers in inverted position on a part of the distance between the inlet and the outlet to drain the fluid content of the containers, and to advance the carriers in upright position at and from the outlet to the inlet for the upright removal and introduction of the containers; means operatively related to the conveyor mechanism to hold the cover against tilting when the carrier is inverted; and means at the inlet and at the outlet to engage the cover to tilt the same thereat into open position.

5. In a draining apparatus, a conveyor mechanism; an inlet operatively related thereto; an outlet operatively related to said mechanism in advance of the inlet in respect to the conveyor movement; a plurality of carriers on said mechanism to be carried thereby; a tiltable perforated cover on each carrier being adapted to hold containers on said carriers, said conveyor mechanism being adapted to advance the carriers in inverted position on a part of the distance between the inlet to the outlet and drain the fluid content of the containers, and to advance the carriers in upright position at and from the outlet to the inlet for the upright removal and introduction of the containers; means operatively related to the conveyor mechanism to hold the cover against tilting when the carrier is inverted; means at the inlet and at the outlet to engage the cover to tilt the same thereat into open position; and means at the inlet and at the outlet, being operated in synchronism with the conveyor movement, to move the cans respectively onto the carrier, and out of the carrier as the carrier is advanced past the said inlet and outlet respectively.

6. In a draining apparatus a heating box; a conveyor mechanism therein; an inlet operatively related thereto; an outlet operatively related to said mechanism in advance of the inlet in respect to the conveyor movement; a plurality of carriers on said mechanism to be carried thereby; a tiltable perforated cover on each carrier being adapted to hold containers on said carriers, said conveyor mechanism being adapted to advance the carriers in inverted position on a part of the distance between the inlet and the outlet to drain the fluid content of the containers, and to advance the carriers in upright position at and from the outlet to the inlet for the upright removal and introduction of the containers; and means operatively related to the conveyor mechanism to hold the cover against tilting when the carrier is inverted.

7. In a draining apparatus a heating box; a conveyor mechanism therein; an inlet operatively related thereto; an outlet operatively related to said mechanism in advance of the inlet in respect to the conveyor movement; a plurality of carriers on said mechanism to be carried thereby; a tiltable perforated cover on each carrier being adapted to hold containers on said carriers, said conveyor mechanism being adapted to advance the carriers in inverted position on a part of the distance between the inlet and the outlet to drain the fluid content of the containers, and to advance the carriers in upright removal and introduction of the containers; stationary means on the box operatively related to the conveyor mechanism to hold the cover against tilting when the carrier is inverted; and means at the inlet and at the outlet to engage the cover to tilt the same thereat into open position.

8. In a draining apparatus a heating box; a conveyor mechanism therein; an inlet operatively related thereto; an outlet operatively related to said mechanism; a plurality of carriers on said mechanism to be carried thereby; a tiltable perforated cover on each carrier being adapted to hold containers on said carriers, said conveyor mechanism being adapted to advance the carriers in inverted position between the inlet and the outlet to drain the fluid content of the containers, and to advance the carriers in upright removal and introduction of the containers; means operatively related to the conveyor mechanism to hold the cover against tilting when the carrier is inverted; means at the inlet and at the outlet to engage the cover to tilt the same thereat into open position; and means at the inlet and at the outlet, being operated in synchronism with the conveyor movement, to move the cans respectively onto the carrier, and out of the carrier as the carrier is advanced past the said inlet and outlet respectively.

9. In a drainer apparatus, an endless conveyor; a series of carriers thereon, to be carried in upright position in one direction, and in inverted position in the return direction of the conveyor; a perforated cover tiltably mounted on each base being adapted to engage the open end of a container to hold the same on the base; said container being drained thru said cover; guides disposed alongside the conveyor for guiding base during the upright travel of the carriers; a second set of guides in operative relation to the conveyor to guide the cover and to hold the same against tilting during the inverted travel of the carriers; an inlet, and an outlet adjacent the path of the upright travel of the carriers respectively for the introduction and the withdrawal of the filled containers therefrom.

10. In a drainer apparatus, an endless conveyor; a series of carriers thereon, to be carried in upright position in one direction, and in inverted position in the return direction of the conveyor; a perforated cover tiltably mounted on each base being adapted to engage the open end of a container to hold the same on the base, said container being drained thru said cover; guides disposed alongside the conveyor for guiding the base during the upright travel of the carriers; a second set of guides in operative relation to the conveyor to guide the cover and to hold the same against tilting during the inverted travel of the carriers; an inlet, and an outlet adjacent the path of the upright travel of the carriers respectively for the introduction and the withdrawal of the filled containers therefrom; and means at said inlet and at said outlet to cause the tilting of said cover into open position thereat.

11. In a drainer apparatus, an endless conveyor; a series of carriers thereon, to be carried in upright position in one direction, and in inverted position in the return direction of the conveyor; a perforated cover tiltably mounted on each base being adapted to engage the open end of a container to hold the same on the base, said container being drained thru said cover; guides disposed alongside the conveyor for guiding the base during the upright travel of the carriers; a second set of guides in operative relation to the conveyor to guide the cover and to hold the same against tilting during the inverted travel of the carriers; an inlet; and an outlet adjacent the path of the upright travel of the carriers respectively for the introduction and the withdrawal of the filled containers therefrom; means at said inlet and at said outlet to cause the tilting of said cover into open position thereat; and means at the inlet and at the outlet, being operated in synchronism with the conveyor movement, to move the cans respectively into the carrier, and out of the carrier as the carrier is advanced past the said inlet and outlet respectively.

12. In a drainer apparatus, an endless conveyor; a series of carriers thereon, to be carried in upright position in one direction, and in inverted position in the return direction of the conveyor; a perforated cover tiltably mounted on each base being adapted to engage the open end of a container to hold the same on the base, said container being drained thru said cover; guides disposed alongside the conveyor for guiding the base during the upright travel of the carriers; a second set of guides in operative relation to the conveyor to guide the cover and to hold the same against tilting during the inverted travel of the carriers; an inlet, and an outlet adjacent the path of the upright travel of the carriers respectively for the introduction and the withdrawal of the filled containers therefrom; and means at said inlet and at said outlet to cause the tilting of said cover into open position thereat, said carriers being open at one side thereof to allow the introduction and the withdrawal of containers thru said open side.

13. In a drainer apparatus, an endless conveyor; a series of carriers thereon, to be carried in upright position in one direction, and in inverted position in the return direction of the conveyor; a perforated cover tiltably mounted on each base being adapted to engage the open end of a container to hold the same on the base, said container being drained thru said cover; guides disposed alongside the conveyor for guiding the base during the upright travel of the carriers; a second set of guides in operative relation to the conveyor to guide the cover and to hold the same against tilting during the inverted travel of the carriers; an inlet, and an outlet adjacent the path of the upright travel of the carriers respectively for the introduction and the withdrawal of the filled containers therefrom; means at said inlet and at said outlet to cause the tilting of said cover into open position thereat; means at the inlet and at the outlet, being operated in synchronism with the conveyor movement, to move the cans respectively into the carrier, and out of the carrier as the carrier is advanced past the said inlet and outlet respectively; and a guide on each can moving means extending over the open carrier at said inlet and at said outlet to guide the containers respectively to and from said carriers.

14. A drainer carrier for an endless conveyor, having guides adjacent thereto, comprising an open base secured to the conveyor; a perforated cover (tiltably) secured at an edge of the base to rest upon the open top of a container on the base to hold the same in place; means extending from the cover adapted to be depressed to tilt the cover to release the container, said means being adapted to be engaged by said guides and held in closed position as the carrier is carried in an inverted position thru the return path of the conveyor.

15. A drainer carrier for an endless conveyor, having guides adjacent thereto, comprising an open base secured to the conveyor; a perforated cover (pivotally) secured at an edge of the base to rest upon the open top of a container on the base to hold the same in place; means extending from the cover adapted to be depressed to tilt the cover to release the container, said means being adapted to be engaged by said guides and held in closed position as the carrier is carried in an inverted position thru the return path of the conveyor, said extending means comprising projections extending beyond the cover in opposite directions transversely to the pivot of the cover; and a roller on each extension to ride on said guides.

16. A drainer carrier for an endless conveyor, having guides adjacent thereto, comprising an open base secured to the conveyor; a perforated cover pivotally secured at an edge of the base to rest upon the open top of a container on the base to hold the same in place; means extending from the cover adapted to be depressed to tilt the cover to release the container, said means being adapted to be engaged by said guides and held in closed position as the carrier is carried in an inverted position thru the return path of the conveyor, said extending means comprising projections extending beyond the cover in opposite directions transversely to the pivot of the cover; and a roller on each extension to ride on said guides, said base and said cover conforming to the shape of the container.

In testimony whereof, I have hereunto set my hand at San Francisco, California, this 16th day of January 1930.

GEORGE D. GARDNER.